(12) United States Patent
Rodoni et al.

(10) Patent No.: US 12,498,389 B2
(45) Date of Patent: Dec. 16, 2025

(54) SAMPLE PROCESSING

(71) Applicant: CTC ANALYTICS AG, Zwingen (CH)

(72) Inventors: Michele Rodoni, Courgevaux (CH); Melchior Zumbach, Lenzburg (CH)

(73) Assignee: CTC ANALYTICS AG, Zwingen (CH)

( * ) Notice: Subject to any disclaimer, the term of this patent is extended or adjusted under 35 U.S.C. 154(b) by 1052 days.

(21) Appl. No.: 17/266,342

(22) PCT Filed: Apr. 26, 2019

(86) PCT No.: PCT/EP2019/060809
§ 371 (c)(1),
(2) Date: Feb. 5, 2021

(87) PCT Pub. No.: WO2020/030307
PCT Pub. Date: Feb. 13, 2020

(65) Prior Publication Data
US 2021/0311084 A1 Oct. 7, 2021

(30) Foreign Application Priority Data
Aug. 8, 2018 (EP) ..................................... 18188008

(51) Int. Cl.
*G01N 35/10* (2006.01)
*B01L 3/00* (2006.01)
*B01L 9/00* (2006.01)
*G01N 35/00* (2006.01)

(52) U.S. Cl.
CPC ............... *G01N 35/10* (2013.01); *B01L 3/54* (2013.01); *B01L 9/543* (2013.01); *G01N 35/00732* (2013.01); *G01N 35/0099* (2013.01); *B01L 2200/025* (2013.01); *B01L 2300/021* (2013.01); *G01N 2035/00752* (2013.01); *G01N 2035/00772* (2013.01); *G01N 2035/00801* (2013.01)

(58) Field of Classification Search
CPC ............. G01N 35/10; G01N 35/00732; G01N 35/0099; G01N 2035/00752; G01N 2035/00772; G01N 2035/00801; B01L 3/54; B01L 9/543; B01L 2200/025; B01L 2300/021
See application file for complete search history.

(56) References Cited

U.S. PATENT DOCUMENTS 9,012,163 B2 * 4/2015 Burd ..................... B01L 3/0262
435/7.92
2010/0126857 A1 5/2010 Polwart et al.

FOREIGN PATENT DOCUMENTS

EP 1 855 802 A2 11/2007
WO WO 2016/168692 A1 10/2016

OTHER PUBLICATIONS

O'Farrell, Brian et al. "Transforming microbial genotyping: a robotic pipeline for genotyping bacterial strains." PloS one vol. 7,10 (2012): e48022. doi:10.1371/journal.pone.0048022 (Year: 2012).*
Siderovski P. David, "Methods in Enymology. vol. 389—Part.A. Section II. G-protein regulators of model organisms" Elsevier, Dec. 31, 2004, pp. 326-328, ISBN: 978-0-08-049726-6. XP055556373. p. 327.

* cited by examiner

*Primary Examiner* — Gregory S Emch
*Assistant Examiner* — Mckenzie A Dunn
(74) *Attorney, Agent, or Firm* — Birch, Stewart, Kolasch & Birch, LLP

(57) ABSTRACT

A method for automated processing of a sample using a first pipette tip container (110) having a first pipette tip comprises the steps of: removing the first pipette tip (160) from the first pipette tip container (110); feeding the sample into the first pipette tip container (110); processing the sample in the first pipette tip container (110). A rack (100) comprises at least one first pipette tip container (110) having a first pipette tip (160), wherein the rack (100) comprises means for identifying an alignment of an orientation of the rack (100) in a rack receptacle of an apparatus for automated processing of a sample. A transport arrangement comprises at least two racks (100), wherein at least one bottom region of a pipette tip container (110) of a first rack (100) is in direct contact with a releasable covering, in particular a tear-off film of a second rack (100).

21 Claims, 2 Drawing Sheets

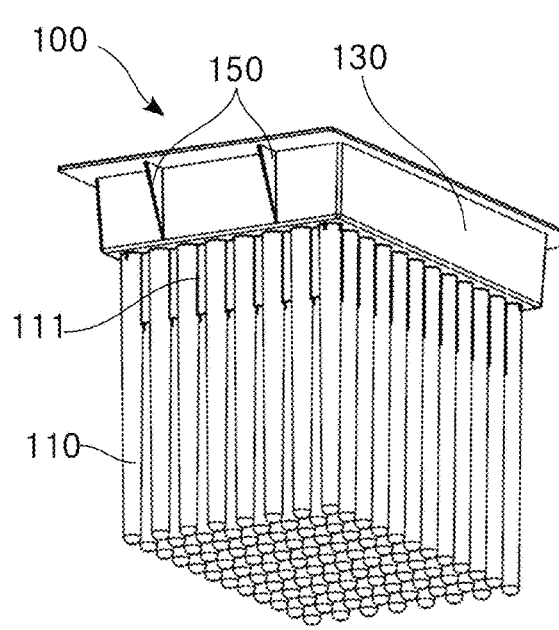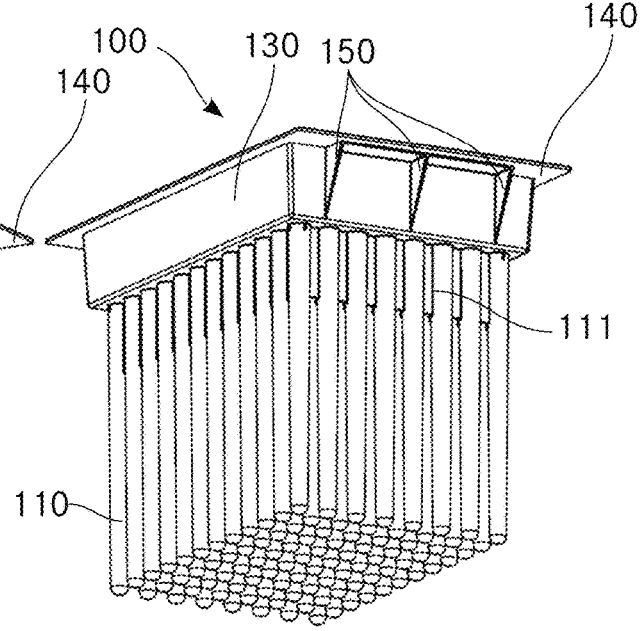
Fig. 3a   Fig. 3b
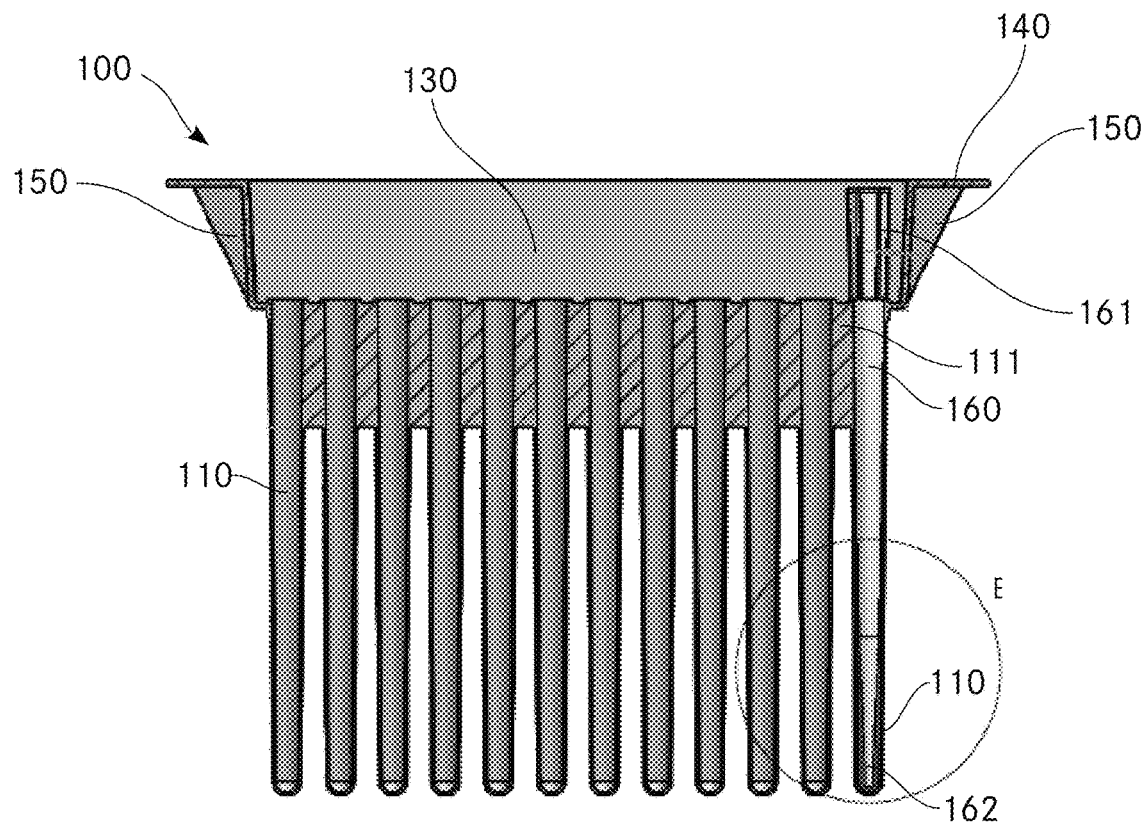
Fig. 4

SAMPLE PROCESSING

TECHNICAL FIELD

The invention relates to a method for automated processing of a sample using a first pipette tip container having a first pipette tip, wherein the first pipette tip is removed from the first pipette tip container. Furthermore, the invention comprises a rack comprising at least one first pipette tip container having a first pipette tip, and a transport arrangement comprising at least two racks.

PRIOR ART

Great quantities of pipettes, in particular micropipettes, are used, inter alia, in chemical and biological analyses. Owing to the purity requirements in an analysis laboratory, pipettes are typically used in the form of disposals that are disposed of directly after their use.

In particular in the case of automatic analysis devices, use is preferably made of pipette tips which can be fastened to a pipetting apparatus. With the pipetting apparatus, a sample can then be drawn up into, and discharged from, the pipette tip. Only the pipette tip comes into contact with the sample during use.

The pipette tips are used for transporting samples. In analysis procedures, the sample can be transported, for example, to a processing station where the sample is prepared for subsequent analysis. The preparation of the sample can include, for example, diluting and thoroughly mixing the sample.

The known methods have the disadvantage of being highly complicated and thus expensive. In particular, the sample preparation is associated with a large number of working steps causing a great quantity of waste or contaminated devices.

SUMMARY OF THE INVENTION

It is the object of the invention to provide a method for automated processing of a sample, which method belongs to the technical field mentioned at the beginning and which can be carried out particularly cost-effectively and in a space-saving manner.

The achievement of the object is defined by the features of claim 1. According to the invention, the following two steps are carried out:
feeding the sample into the first pipette tip container;
processing the sample in the first pipette tip container.

According to the invention, the sample is therefore now processed in a pipette tip container, i.e. the pipette tip container can thus be used for processing a sample. This has the advantage that no separate containers are necessary for processing the samples. The method can thus be carried out particularly cost-effectively and in a space-saving manner. Furthermore, by reducing the consumables, a particularly ecological method is achieved.

The use of the pipette tip container has the particular advantage of already being present as a sterile-packed container. The pipette tip container is thus particularly readily suitable for processing a sample. The sterility of the empty pipette tip container that has hitherto not been used further can thus be used for processing a sample, in particular for preparing a sample for subsequent analysis. A particularly economic and ecological method is thus achieved.

Owing to the fact that the pipette tip container is used for processing the sample, a space-saving method can furthermore be provided. No additional space for processing the sample therefore has to be provided.

The x, y and z direction is understood as meaning a cartesian system of coordinates. The x and y directions form a horizontal plane, and the z direction forms the vertical, unless stated differently.

The expressions "a", "b" and "a and b" are subsumed under the expression "a and/or b".

The pipette tip container is preferably designed as a container made from plastic, in particular, for example, from a thermoplastic, such as acrylonitrile butadiene styrene (ABS), polyamide (PA), polylactate (PLA), polymethylmethacrylate (PMMA), polycarbonate (PC), polyethyleneterephthalate (PET), polyethylene (PE), polypropylene (PP), polystyrene (PS), polyetheretherketone (PEEK) and polyvinylchloride (PVC), particularly preferably from polypropylene (PP). However, it can also be formed from other materials, such as, for example, a composite material or a coated material. In particular, for example, a cardboard-like material having a fluid-tight inner coating can be provided as the pipette tip container. Further suitable materials and material compositions are known to a person skilled in the art.

The pipette tip container is preferably in the form of a cylinder which is closed on one side, in particular a circular cylinder. The pipette tip container is substantially adapted to the shape of the pipette tip.

The pipette tip is preferably designed as a disposable item or as what is referred to as disposal. The pipette tip is preferably designed for metering volumes in the range of below 5 ml, preferably in the range of below 2 ml, particularly preferably in a range of below 1.5 ml. In a particularly preferred embodiment, the metering volume of the pipette tip is approximately 1000 µl. In variants, the metering volume of the pipette tip can also be, however, greater than 5 ml, in particular, for example, 10 ml or more. In further embodiments, the volume can also be significantly under 1000 µl, in particular, for example, 200 µl or 20 µl.

The pipette tip container is likewise preferably designed as a disposable item. The pipette tip container preferably has a volume of less 10 ml, preferably less than 5 ml, particularly preferably less than 3 ml. In a particularly preferred embodiment, the pipette tip container comprises a volume of approximately 3000 µl. In variants, the volume of the pipette tip container can also be, however, greater than 5 ml, in particular, for example, 10 ml or more, or else significantly under 3000 µl, in particular, for example, 500 µl or 60 µl. The volume of the pipette tip container is in particular preferably adapted to the pipette tip and to the designated use as a dilution vessel.

The pipette tip is preferably moved by a pipetting robot. For this purpose, the pipetting robot comprises a pipette, preferably a piston pipette, to which the pipette tip can be fastened. The pipette tip is preferably via a frictional connection, wherein the pipette is inserted in a pipette longitudinal direction into an upper end of the pipette tip. For this purpose, the pipette has an external cone corresponding to the internal cone of the pipette tip. The pipette tip is thus particularly simply fastened to the pipette.

The pipetting robot can be provided as a universal robot which, in particular, for example, can also transport a syringe with a cannula, a vial, etc.

In variants, the pipette tip can also be transported in some other way. Furthermore, the pipette tip can be positionally fixed with respect to the x and y plane and, for example, movable only in the z direction during movement of the pipette tip container or further sample vessels.

The sample is preferably a liquid. The sample is particularly preferably a liquid to be analyzed. The liquid can be transported particularly simply with a pipetting robot to the pipette tip container and/or to an analysis device. The liquid can comprise a solvent, such as, for example, water, hydrocarbons, alcohols, ethers, etc. The liquid can be present as a solution. The liquid can in particular also comprise a suspension, an emulsion, etc.

In variants, the sample can also be present as a solid. In this case, the processing of the sample can comprise, for example, dissolving the sample in a solvent.

The sample is preferably fed into the first pipette tip container with a pipette tip, in particular the first pipette tip. Particularly efficient and economical processing of a sample can therefore be achieved. The use of the pipette tip of the pipette tip container furthermore has the advantage that said pipette tip can be shaped in a manner corresponding to the pipette tip container, and therefore feeding of the sample into the pipette tip container can be optimized. For example, the pipette tip can thus be introduced particularly deeply into the pipette tip container, and therefore contamination of the surroundings with the sample can be avoided.

If the sample is intended to be mixed with a solution, in particular, for example, with a dilution solution, in a preferred method, in a first step, the dilution solution can be fed into the pipette tip container, and, in a second subsequent step, the sample can be fed into the pipette tip container. Contamination of the solution with the sample can thus be avoided. Alternatively, the method can also proceed in the reverse sequence, with the sample being introduced into the pipette tip container before the dilution solution.

In variants, the sample can also be fed into the pipette tip container with a syringe, a pump, a container or some other means. In particular, the pipette tip container does not necessarily have to be used in the same method for processing a sample in which the pipette tip is used.

The processing of the sample preferably comprises physical or chemical treatment of the sample in the pipette tip container. The processing of the sample can comprise a plurality of method steps.

In variants, the processing of the sample can comprise merely distributing or portioning the sample.

The processing of the sample preferably comprises mixing the sample in the pipette tip container with a substance, in particular a liquid, preferably a reagent. The sample can thus be prepared for a subsequent analysis. The substance can carry out a plurality of functions here. For example, the addition of the substance makes it possible for certain materials to be precipitated. Furthermore, the analyte or materials of the matrix can be chemically converted, in particular in order, for example, to simplify an analysis. For example, the analyte can thus be marked for the analysis or, by conversion of acids or a base into a salt and vice versa, can be adapted to the solubility of the analysis method. A person skilled in the art knows any number of methods with which an analyte or the matrix can be prepared for subsequent analysis.

In a particularly preferred method, the sample is mixed in the pipette tip container with a buffer, in particular with a salt solution.

In variants, the sample can also be processed without the addition of a substance.

The processing of the sample preferably comprises diluting the sample. For this purpose, the sample can be mixed in the pipette tip container with a defined quantity of a solvent. The pipette tip container can be correspondingly dimensioned for this purpose.

In variants, the diluting of the sample can be omitted.

The sample is preferably thoroughly mixed in the pipette tip container, in particular by drawing up and discharging same once or repeatedly by means of a pipette tip. A homogeneous solution can thus be achieved, and therefore, in turn, a robust and reproducible analysis of the sample can be achieved. However, the sample can also be thoroughly mixed in some other way, for example by shaking the pipette tip container.

In variants, the thorough mixing of the sample can also be dispensed with.

The processing of the sample preferably comprises heating and/or cooling the sample. A dissolution process can thus be influenced, in particular if a material is intended to be precipitated or resolved. The temperature of the sample is particularly preferably controlled for the subsequent analysis. For example, the precision for volumetric metering can thus be increased. Furthermore, the heating can result in degassing of the sample.

In variants, the heating or cooling of the sample can be dispensed with.

After processing of the sample, the sample is preferably at least partially removed from the pipette tip container, in particular with a pipette tip or a syringe of an autosampler. The sample can subsequently be further processed or subjected to an analysis.

In variants, the sample can also be analyzed in the pipette tip container itself.

Preferably, after processing of the sample, the sample is analyzed, preferably bioanalytically, in particular in immunoassays, particularly preferably with ELISA (assays on the basis of enzyme labels). Other bioanalytic methods can also be provided, for example RIA (radioimmunoassays), etc. The use of the pipette tip container for processing a sample is suitable in particular for samples with relatively low volumes that are sufficient for such analyses.

In variants, the sample can also be analyzed in some other way, in particular with a chromatograph, preferably a liquid chromatograph or gas chromatograph, etc. A person skilled in the art knows any number of analysis techniques which can be carried out depending on the analyte to be analyzed in the sample.

After use, the pipette tip is preferably disposed of in a pipette tip container, preferably in the first pipette tip container. The pipette tip container therefore carries out three functions:
  transport of a pipette tip;
  container for processing a sample;
  disposal container.

The method can thus be carried out particularly economically since no separate disposal container for the pipette tip has to be provided. Furthermore, a particularly space-saving method is thus also achieved since no additional space has to be provided for preparing the samples and for a pipette-tip disposal container.

In variants, the pipette tip can also be disposed of in some other way, for example in a separate disposal container.

Preferably, the sample after processing, in particular a residue of the sample following analysis of the sample, is disposed of in a pipette tip container, preferably in the first pipette tip container. As already mentioned above, the first pipette tip container after the main use, i.e. after processing of the sample and after a possible further use, such as, for example, an analysis or the like, can be used as a disposal container. The sample and/or the pipette tip can be disposed of in the pipette tip container. It is clear to a person skilled in the art that further substances and objects can also be disposed of in the pipette tip container.

In variants, the sample can also be disposed of in some other way, for example in a separate sample disposal container.

Preferably, the first pipette tip container together with a plurality of further pipette tip containers forms a rack, wherein the first pipette tip is moved with the pipetting robot in such a manner that the first pipette tip moves exclusively over pipette tip containers that are no longer used.

The rack is preferably rectangular and preferably comprises a plurality of parallel rows of pipette tip containers. Particularly preferably, the rack comprises between 2 and 20, particularly preferably between 4 and 12, in particular, for example, 8 rows each preferably having between 2 and 20, particularly preferably between 8 and 14, in particular, for example, 12 pipette tip containers. In the particularly preferred embodiment, the rack therefore comprises 8 rows each having 12 pipette tip containers or 8 rows and 12 columns. This therefore results in 96 pipette tip containers. However, it is clear to a person skilled in the art that the rack can also comprise more or fewer pipette tip containers in different arrangements. In the preferred embodiment, one pipette tip container in the interior of the rack has 4 pipette tip containers as closest neighbors. In particular, the pipette tip container rows can also be arranged, for example, in a manner offset with respect to one another in order to achieve a more compact construction of the rack. In this case, one pipette tip container in the interior of the rack has six pipette tip containers as closest neighbors.

In the method, the pipette tip is now moved over the rack in such a manner that, in particular during or after transport of a liquid to or away from a pipette tip container, pipette tips, which have not yet been used, in the further pipette tip containers cannot be contaminated by a drop falling down from the pipette tip. For this purpose, the pipette tip, in particular during or after transport of a liquid, is preferably moved exclusively over pipette tip containers which have already been used. This method is of advantage in particular in the case of racks which have a common closure for all the pipette tip containers, for example in the case of a rack which is closed with a tear-off film.

In variants, the pipette tip containers can also be closed individually. Furthermore, the transport device can also comprise a drip protection device, and therefore contamination of the further pipette tip containers can be avoided.

In a further preferred embodiment, a plurality of pipette tips are removed simultaneously from a plurality of pipette tip containers with the pipetting robot, wherein likewise samples are fed simultaneously into the plurality of pipette tip containers, in particular with the plurality of pipette tips. The plurality of samples can also be processed simultaneously.

In variants, each pipette tip can also be removed individually from the pipette tip container. The sample does not have to be fed in simultaneously in the case of a plurality of pipette tip containers. Also, a plurality of samples do not have to be processed simultaneously in the pipette tip containers.

Preferably, the first pipette tip container together with a plurality of further pipette tip containers forms a rack, wherein the rack is inserted into a rack receptacle of a device for automated processing of a sample, and wherein an orientation of the rack relative to the rack receptacle is determined. For this purpose, the rack preferably comprises means for identifying an alignment of an orientation of the rack in a rack receptacle of an apparatus for automated processing of a sample. It can thus be checked whether the rack has been inserted correctly before a pipette tip is removed from a pipette tip container of the rack. Furthermore, the orientation of the rack can be essential if a plurality of different pipette tip containers and/or pipette tips are present in the rack, in particular if pipette tips for different volumes, etc., are accommodated in a rack.

In variants, the rack can also be designed in such a manner that the rack can be inserted in different orientations into the rack.

The orientation is preferably determined with reference to a barcode, in particular a 2D barcode on the rack. For this purpose, the rack preferably comprises a barcode, particularly preferably a 2D barcode. However, the barcode can define more than an orientation of the rack. The barcode can also include data about the number and type of pipette tips or pipette tip containers. Furthermore, for example, manufacturer data, such as, for example, the production date and the manufacturer, etc., can be held by the barcode. A person skilled in the art knows further data which can be covered by the barcode.

In variants, the barcode can also be dispensed with. Instead of a barcode, other types of code can also be provided.

The code, in particular the barcode, is preferably arranged (one- or two-dimensionally) on the rack in such a manner that the code is concealed by the tear-off film. In this case, for example, the method can then be started only when the code can be read. This ensures that the tear-off film is removed in the method.

Alternatively, this arrangement of the barcode can also be dispensed with. Furthermore, alternatively or additionally, a code, in particular a barcode, can be arranged on the tear-off film, and it can therefore be checked by reading said code whether the tear-off film has been removed.

In a further preferred variant, the correct orientation of the rack is achieved by a Poka-Yoke shaping or by a mechanical coding. For this purpose, the rack preferably comprises a mechanical coding, in particular a Poka-Yoke shaping, such that the rack can be inserted in precisely one orientation or exclusively in permissible orientations into the rack receptacle. The shaping can comprise, for example, ribs, wherein the rack receptacle has recesses corresponding to the ribs. The ribs are arranged in such a manner that the rack can be inserted only in a single orientation into the rack receptacle.

In variants, the Poka-Yoke shaping can also be dispensed with.

A rack comprises at least one first pipette tip container having a first pipette tip for use in a method for processing a sample.

The rack is preferably provided with a releasable covering, in particular a tear-off film. The releasable covering serves for closing the pipette tip container and therefore for keeping the pipette tips located therein sterile. The releasable covering, in particular in the form of a tear-off film, has the advantage of being able to be produced cost-effectively. Furthermore, a hermetic sealing which is realized particularly simply is thus achieved. The tear-off film can therefore replace a conventional closure. In particular, the provision of the tear-off film means that no further closure of the pipette tip containers is necessary. A particularly space-saving rack is therefore obtained.

In variants, the cover can also be formed from a solid material. A person skilled in the art knows any number of variants for closing openings of pipette tip containers.

The tear-off film preferably comprises a code, in particular a barcode. It can therefore be checked in the method whether the tear-off film has been removed before the rack is inserted into the rack receptacle. The method can thus be stopped if the tear-off film is detected, in order to avoid damage.

In variants, the code on the tear-off film can be dispensed with. Alternatively or additionally, a code can be arranged on the rack itself. In particular, alternatively or additionally, a code can be arranged on the rack in such a manner that the code is concealed by the tear-off film (see above).

The pipette tip container of the rack is preferably in the form of a deep-well. The pipette tip containers thus preferably have a large ratio between a depth of the pipette tip container and the inside diameter, as measured at an upper edge region. The ratio of depth: width can be in particular in a range of 5:1 (i.e. the depth is five times greater than the width) to 20:1, preferably in a range of 13:1 to 15:1. The use of deep-well has the advantage that a sample can be processed in the bottom region of the pipette tip containers with relatively little risk of contamination of adjacent pipette tip containers. In particular if the sample has a low volume, it is possible, for example, for thorough mixing of the sample to be carried out with a solvent by shaking or by drawing up and discharging same with a pipette tip without the sample being able to emerge from the pipette tip container.

In variants, the design of the pipette tip container in the form of a deep-well can be dispensed with. In this case, the ratio between depth and width can also be less than 5:1, in particular, for example, 3:1 or less.

The openings of the pipette tip containers in the rack are preferably in a plane which is surrounded by an edge perpendicular to the plane, wherein the edge is provided distally with a protruding flange aligned parallel to the plane. The flange can serve, for example, as a support in a rack receptacle. The flange can be supported on the outer side via ribs on the edge. In a preferred embodiment, the ribs are arranged in such a manner that they together with recesses in the rack receptacle form a mechanical Poka-Yoke such that the rack can be inserted in precisely one orientation into the rack receptacle. For this purpose, for example on one side of the rack, the flange can be supported on the edge via two ribs and, on an opposite side, the flange can be supported on the edge via three ribs.

However, it is clear to a person skilled in the art that the edge, the flange or the ribs can also be—optionally partially-dispensed with.

A transport arrangement comprises at least two racks, wherein at least a bottom region of a pipette tip container of a first rack is in direct contact with a releasable covering, in particular a tear-off film of a second rack. Conventionally, racks with pipette tips are packed individually all round, for example are completely welded in. The packaging according to the invention now makes it possible to achieve a transport arrangement using particularly little packaging material, and therefore a plurality of racks can be transported particularly cost-effectively.

In a method for transporting at least a first and a second rack, the first rack is positioned in a transport container and the second rack is positioned on the first rack in such a manner that at least one bottom region of a pipette tip container of the first rack is in direct contact with a releasable covering, in particular a tear-off film of the second rack.

Further advantageous embodiments and combinations of features of the invention emerge from the description below of the details and from the entirety of the patent claims.

BRIEF DESCRIPTION OF THE DRAWINGS

In the drawings used for explaining the exemplary embodiment:

FIG. 3a shows a schematic oblique view from below of a first end side of a rack for use in a method for processing a sample;

FIG. 3b shows a view according to FIG. 3a of an end side of the rack opposite the first end side; and FIG. 4 shows a schematic sectional illustration of the rack along a longitudinal axis of the pipette tip container, at a right angle to the end sides.

In principle, identical parts are provided with the same reference signs in the figures.

Ways of Implementing the Invention

Figure 1:
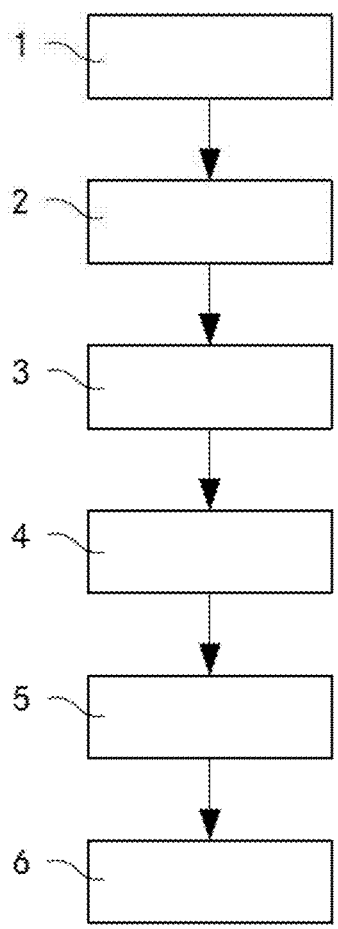
FIG. 1 shows a schematic sequence of a method for processing a sample.

FIG. 1 shows a schematic sequence of a method for processing a sample. In a first variant, the method proceeds as follows:

Step 1: a first pipette tip is removed from a first pipette tip container with a pipetting robot.

Step 2: the pipetting robot moves with the first pipette tip to a sample container, removes a sample and moves back to the first pipette tip container.

Step 3: the pipetting robot discharges the sample into the first pipette tip container.

Step 4: the sample is processed in the first pipette tip container.

Step 5: the processed sample is analyzed.

Step 6: the residue of the processed sample and the pipette tip are disposed of in the first pipette tip container.

In a second variant, the sample is removed with a second pipette tip and discharged into the first pipette tip container.

In a third variant, the sample is transferred from the sample container into the first pipette tip container without use of a pipette tip.

In a fourth variant, the processing of the sample in step 4 comprises diluting the sample with a solvent. For this purpose, the solvent is removed from a solvent container with a pipette tip and discharged into the first pipette tip container. In order to thorough mix the diluted sample, after the solvent is discharged the mixture is repeatedly drawn up and discharged.

Following the processing of the sample, the processed sample is subjected in a step 5 preferably to an analysis. For the analysis, the processed sample in a fifth variant is first of all analyzed bioanalytically, in particular by means of ELISA, and assessed, preferably visually. Furthermore, chromatograph separation can also be provided, in particular by means of HPLC or GC. The analysis can be carried out by means of detectors known to a person skilled in the art, in particular a spectrometer (for example a UV/Vis detector), mass spectrometer, etc. A person skilled in the art knows further detectors.

Figure 2:
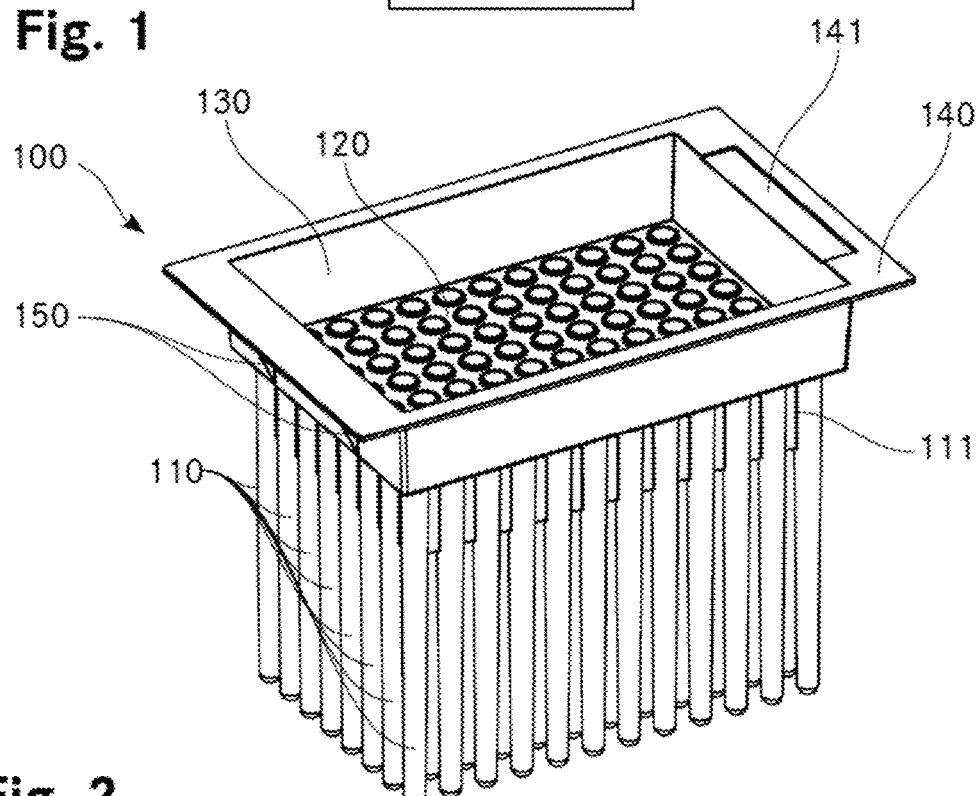
FIG. 2 shows a schematic oblique view from above of a rack for use in a method for processing a sample.

In the method, use is preferably made of racks which comprise a multiplicity of pipette tip containers having pipette tips. One possible embodiment of such a rack is described below with reference to FIGS. 2 to 4. FIG. 2 shows a schematic oblique view from above of a rack 100 for use in a method for processing a sample.

The rack 100 here comprises 8 rows of 12 pipette tip containers 110, and therefore a total of 96 pipette tip containers 110. The pipette tip containers 110 are designed substantially as elongate circular cylinders which are closed on one side. Over approximately a quarter of the overall length, adjacent to the openings 112 of the pipette tip containers 110, the latter have struts 111 between the four adjacent pipette tip containers 1110. Instead of the struts 111, the pipette tip containers 110 in this region can also be completely cast together. The openings 112 of the pipette tip containers 110 are located in a plate 120. The plate 120 is bordered by a rectangular frame 130 which is perpendicular to the plate 120. In an edge region, the frame 130 comprises an encircling flange 140 which has a greater overhang on two opposite sides of the frame 130 than on the other sides of the frame 130. In the region of the greater overhang, the flange 140 is supported on the frame 130 via ribs 150. The ribs 150 here have a triangular shape. In a region of a greater overhang, the flange 140 has a surface depression 141 in which a barcode (not illustrated) is arranged. The barcode serves for identifying the rack 100, in particular the type and dimensions of the pipette tips and of the pipette tip containers 110. Instead of a barcode (one-dimensionally or 1D) or, for example, as a QR code (two-dimensionally or 2D) or present in a further form adapted to the rack 100. In particular, any known codes can be provided.

In FIG. 2 here, no pipette tips are illustrated in the pipette tip containers 110. The pipette tip containers 110 are in the form of what is referred to as a deep-well and therefore have a relatively large length with respect to a maximum inside diameter. The length of the pipette tip container 110 corresponds to around 15 times the maximum inside diameter thereof. However, the invention is not restricted to specific forms of pipette tip container. The pipette tip containers 110 can thus also have other ratios between maximum inside diameter and length.

FIG. 3a shows a schematic oblique view from below of a first end side of the rack 100 for use in a method for processing a sample. In this illustration, it is apparent that, on the first end side, the flange 140 is supported on the frame 130 via two ribs 150.

FIG. 3b shows a view according to FIG. 3a of an end side of the rack 100 opposite the first end side. It is apparent here that, on the second end side, the flange 140 is supported on the frame 130 via three ribs 150.

The rack receptacle (not illustrated) has a recess in accordance with the external dimensions of the frame 130 such that the rack 100 can be inserted into the recess. The recess furthermore has two slots on one side and three slots on the opposite side, into which slots the ribs 150 are introduced. The rack 100 can thus be inserted in precisely one orientation into the rack receptacle.

FIG. 4 shows a schematic sectional illustration of the rack 100 along a longitudinal axis of the pipette tip container 110, at a right angle to the end sides. A pipette tip 160 is arranged in a pipette tip container 110. The pipette tip 160 has a head part 161 into which a pipetting robot can plug the pipette. The pipette tip 160 is then held on the pipette via a frictional connection and can be removed from the pipette tip container 110. The pipette tip 160 has a tip 162 which projects deeply into the pipette tip container 110. It is thus possible that, with the pipette tip 160, a sample can be virtually completely removed from the pipette tip container 110 and also, by drawing in and discharging said sample, the latter can also be thoroughly mixed.

For storage and transport, a rack 100 which is filled with the pipette tips 160 has a tear-off film (not illustrated). The latter is adhesively bonded to the flange 140. The racks 100 can be packed directly in boxes without further individual packaging, wherein pipette tip containers 110 of a first rack 100 are in direct contact with a tear-off film of a second rack 100.

For using the method, the tear-off film is removed from the rack 100. Since all of the pipette tip containers 110 are therefore exposed, in the method the pipetting robot is moved in such a manner that the movement does not cross over pipette tips 160 or pipette tip containers 110 that have not yet been used. Contamination of the sterile pipette tips 160 or pipette tip containers 110 is therefore avoided.

In summary, it should be noted that a method for processing a sample is created according to the invention, which method can be carried out using fewer resources and with relatively little need for space.

The invention claimed is:

1. A method for automated processing of a sample using a first pipette tip container having a first pipette tip, comprising the following steps, carried out in sequence:
   removing the first pipette tip from the first pipette tip container; and thereafter
   feeding the sample into the first pipette tip container; and thereafter
   processing the sample in the first pipette tip container.

2. The method according to claim 1, wherein the pipette tip is moved by a pipetting robot.

3. The method according to claim 1, wherein the sample is fed into the first pipette tip container with a pipette tip.

4. The method according to claim 3, wherein the sample is fed into the first pipette tip container with a the first pipette tip.

5. The method according to claim 1, wherein the processing of the sample comprises diluting the sample.

6. The method according to claim 1, wherein the processing of the sample comprises drawing up and discharging same by means of a pipette tip, for thoroughly mixing the sample.

7. The method according to claim 1, wherein, after processing of the sample, the sample is at least partially removed from the pipette tip container.

8. The method according to claim 7, wherein, after processing of the sample, the sample is at least partially removed from the pipette tip container with a pipette tip or a syringe of an autosampler.

9. The method according to claim 7, wherein, after processing of the sample, the sample is bioanalytically analyzed.

10. The method according to claim 9, wherein, the sample is analyzed in immunoassays.

11. The method according to claim 10, wherein, after processing of the sample, the sample is analyzed in immunoassays with ELISA.

12. The method according to claim 1, wherein, after use, the pipette tip is disposed of in a pipette tip container.

13. The method according to claim 12, wherein, after use, the pipette tip is disposed of the first pipette tip container.

14. The method according to claim 1, wherein the sample after processing is disposed of in a pipette tip container.

15. The method according to claim 14, wherein the sample after processing is disposed of in the first pipette tip container.

16. The method according to claim 1, wherein the first pipette tip container together with a plurality of further pipette tip containers forms a rack, wherein the pipette tip is moved with the pipetting robot in such a manner that the pipette tip moves exclusively over pipette tip containers that are no longer used.

17. The method according to claim 1, wherein the first pipette tip container together with a plurality of further pipette tip containers forms a rack, wherein the rack is inserted into a rack receptacle of a device for automated processing of a sample, and wherein an orientation of the rack relative to the rack receptacle is determined.

18. The method according to claim 17, wherein the orientation is determined with reference to a barcode on the rack.

19. The method according to claim 18, wherein the orientation is determined with reference to a 2D barcode on the rack.

20. The method according to claim 17, wherein the orientation is determined with reference to a mechanical coding.

21. The method according to claim 20, wherein the orientation is determined with reference to a Poka-Yoke shaping.

* * * * *